US010179891B2

(12) United States Patent
Detering et al.

(10) Patent No.: US 10,179,891 B2
(45) Date of Patent: Jan. 15, 2019

(54) USE OF BRANCHED POLYESTERS BASED ON CITRIC ACID AS ADDITIVE IN WASHING COMPOSITIONS, DETERGENTS OR A FORMULATION FOR WATER TREATMENT

(71) Applicant: BASF SE, Ludwigshafen (DE)

(72) Inventors: Jürgen Detering, Limburgerhof (DE); Monika Haberecht, Ludwigshafen (DE); Anna Müller-Cristadoro, Waldems (DE); Heike Weber, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 1086 days.

(21) Appl. No.: 13/950,426

(22) Filed: Jul. 25, 2013

(65) Prior Publication Data
US 2014/0027669 A1  Jan. 30, 2014

Related U.S. Application Data

(60) Provisional application No. 61/675,354, filed on Jul. 25, 2012.

(51) Int. Cl.
C11D 3/37 (2006.01)
C02F 1/68 (2006.01)
C11D 3/39 (2006.01)
C08G 63/12 (2006.01)
C02F 5/10 (2006.01)
C02F 1/04 (2006.01)
C02F 1/44 (2006.01)
C02F 1/469 (2006.01)
C02F 103/08 (2006.01)

(52) U.S. Cl.
CPC .............. C11D 3/3715 (2013.01); C02F 5/10 (2013.01); C08G 63/12 (2013.01); C11D 3/39 (2013.01); C11D 3/3907 (2013.01); C02F 1/04 (2013.01); C02F 1/441 (2013.01); C02F 1/4693 (2013.01); C02F 1/68 (2013.01); C02F 2103/08 (2013.01)

(58) Field of Classification Search
CPC .................................................. C08G 63/12
See application file for complete search history.

(56) References Cited

U.S. PATENT DOCUMENTS

| 3,563,903 | A | 2/1971 | Schmadel et al. |
| 5,017,594 | A | 5/1991 | Seele et al. |
| 5,039,447 | A | 8/1991 | Reuben |
| 5,128,357 | A | 7/1992 | Seele et al. |
| 5,292,447 | A | 3/1994 | Venturello et al. |
| 5,294,362 | A | 3/1994 | Venturello et al. |
| 5,422,028 | A | 6/1995 | Oakes et al. |
| 5,508,394 | A | 4/1996 | Kappes et al. |
| 5,652,330 | A | 7/1997 | Boeckh et al. |
| 6,462,006 | B1 | 10/2002 | Sorg et al. |
| 6,861,498 | B1* | 3/2005 | Imperante ................ A61K 8/85 528/272 |
| 8,182,796 | B1 | 5/2012 | O'Lenick et al. |
| 2005/0054812 | A1* | 3/2005 | Wagner .................. C08G 63/06 528/272 |
| 2010/0273651 | A1 | 10/2010 | Dietz et al. |
| 2012/0053303 | A1 | 3/2012 | Djuric et al. |

FOREIGN PATENT DOCUMENTS

| AU | 637258 B2 | 5/1993 | |
| CA | 2781185 A1 | 6/2011 | |
| DE | 1617122 A1 | 2/1971 | |
| DE | 198 19 187 A1 | 11/1999 | |
| EP | 352673 A2 | 1/1990 | |
| EP | 391311 A2 | 10/1990 | |
| EP | 474045 A1 | 3/1992 | |
| EP | 851 023 A2 | 7/1998 | |
| JP | H06122759 A | 5/1994 | |
| WO | WO-92/16493 A1 | 10/1992 | |
| WO | WO-93/22362 A1 | 11/1993 | |
| WO | WO-2009077500 A2 | 6/2009 | |
| WO | WO-2011/064153 A1 | 6/2011 | |
| WO | WO 2012005645 A1 * | 1/2012 | ............. C08G 63/20 |
| WO | WO-2012028496 A1 | 3/2012 | |

OTHER PUBLICATIONS

English Translation of Japanese Office Action for Application No. 2015-523486, dated Mar. 15, 2016.
U.S. Appl. No. 61/374,287.
European Search Report for EP 13 15 0202, dated Mar. 5, 2013.
Flory et al., "Molecular Size Distribution in Three Dimensional Polymers. VI. Branched Polymers Containing A-R-Bf-1 Type Units", Department of Chemistry of Cornell University, 1951, vol. 74, pp. 2718-2723.
Hölter et al., "Degree of Branching in Hyperbranched Polymers", Acta Polymer, 1997, vol. 48, pp. 30-35.
Sunder et al., "Controlling the Growth of Polymer Trees: Concepts and Perspectives for Hyperbranched Polymers", Chem. Eur. J., 2000, vol. 6, No. 14, pp. 2499-2506.

(Continued)

Primary Examiner — Peter F Godenschwager

(74) Attorney, Agent, or Firm — Drinker Biddle & Reath LLP

(57) ABSTRACT

The present invention relates to the use of branched polyesters obtainable by polycondensation of citric acid with at least one polyalcohol, and optionally with polycarboxylic acid component as additive in washing compositions, cleaners, detergents or a formulation for water treatment and to mixtures comprising such branched polyesters. The invention further relates to the use of hydrophobically modified branched polyesters, and to the method for cleaning, washing or water treatment using such branched polyesters.

11 Claims, No Drawings

(56) References Cited

OTHER PUBLICATIONS

"Biodegradeable electrolyte polymers for prodn of detergent compsns, fibre treating agents, etc—obtd by bonding ester bond-contg poly:carboxylic acids with cpds contg carboxyl gps, etc", Database WPI Accession No. 1994-186445, XP002691249, dated Jun. 5, 1994.

International Search Report for PCT/EP2013/064877, dated Feb. 14, 2014.

* cited by examiner

USE OF BRANCHED POLYESTERS BASED ON CITRIC ACID AS ADDITIVE IN WASHING COMPOSITIONS, DETERGENTS OR A FORMULATION FOR WATER TREATMENT

CROSS-REFERENCE TO RELATED APPLICATIONS

This application claims benefit (under 35 U.S.C. § 119(e)) of U.S. Provisional Application 61/675,354, filed Jul. 25, 2012, which is incorporated by reference herein in its entirety.

BACKGROUND OF THE INVENTION

The present invention relates to the use of branched polyesters obtainable by polycondensation of citric acid with at least one polyalcohol, and optionally with polycarboxylic acid component as additive in washing compositions, cleaners, detergents or a formulation for water treatment and to mixtures comprising such branched polyesters. The invention further relates to the use of hydrophobically modified branched polyesters, and to the method for cleaning, washing or water treatment using such branched polyesters.

WO 93/22362 describes a process for preparing polyesters from citric acid and polyhydroxyl compounds and their use as additive to low-phosphate or phosphate-free detergents and cleaners. The polyhydroxyl compounds are oligo- and polysaccharides, modified oligo- and polysaccharides, and polyvinyl alcohols.

U.S. Pat. No. 5,652,330 describes polycondensates of citric acid which are either polycondensates of citric acid with itself or into which alcohol components are condensed in deficiency with a molar ratio of 100:1 to 2.5:1. The polycondensates described therein are used in detergents and cleaners especially for preventing scale deposits.

WO 2012/028496 describes branched polyesters which comprise citric acid as structural component, processes for preparing such polyesters, and their use for solubilizing sparingly soluble, basic pharmaceutical active ingredients.

WO 92/16493 claims citric acid esters of polyhydroxyl compounds such as polyglycerol or sugar alcohols and their use in detergents and cleaners.

Polymers obtainable by free-radical polymerization and composed of carboxyl-group-containing and/or sulfonic acid-group-containing monomers have been an important constituent of phosphate-containing and phosphate-free machine dishwashing detergents for many years. By virtue of their soil-dispersing and deposit-inhibiting effect, they make a considerable contribution to the cleaning and rinsing performance of machine dishwashing compositions. For instance, they ensure that no salt deposits of the hardness-forming calcium and magnesium ions remain on the ware.

Homopolymers of acrylic acid or copolymers of acrylic acid and 2-acrylamido-2-methylpropanesulfonic acid are often used for this purpose.

These polymers are also used in water-conveying systems as agents for preventing mineral deposits such as e.g. calcium and magnesium sulfate, magnesium hydroxide, calcium and barium sulfate and calcium phosphate on heat transfer surfaces or in pipelines. Water-conveying systems to be mentioned here are inter alia cooling and boiler feed water systems and industrial process waters. However, these polymers are also used as scale inhibitors in the desalination of seawater or brackish water by distillation and by membrane processes such as reverse osmosis or electrodialysis.

One disadvantage of these polymers obtainable by free-radical polymerization and composed of carboxyl-group-containing and/or sulfonic acid-group-containing monomers is that they are not biodegradable. Biodegradable polymers such as, for example, polyaspartic acid, however, have struggled to gain acceptance commercially due to the high production costs.

BRIEF SUMMARY OF THE INVENTION

It was therefore the object of the invention to provide substances which can be used for cleaning purposes, in particular as additive to phosphate-containing and phosphate-free cleaner formulations for machine dishwashing, and for the purpose of scale inhibition in water-conveying systems, and are biodegradable. It was a further object of the invention to provide substances which can be readily incorporated into formulations for cleaning purposes in their various presentation forms.

A DETAILED DESCRIPTION OF THE INVENTION

These and other objects are achieved, as is evident from the disclosure of the present invention, by the various embodiments of the invention, in particular by the use of branched polyesters obtainable by polycondensation of
  a. citric acid (component A) with
  b. at least one polyalcohol (component B) and
  c. optionally a polycarboxylic acid component (component C) and optionally reaction with
  d. at least one component D selected from the group consisting of: C6-C30 alkyl- or alkenylcarboxylic acids, C6-C30 alkyl or alkenyl alcohols, C6-C30 alkyl- or alkenylamines, C6-C30 aliphatic isocyanates during the polycondensation or subsequently
as additive in washing compositions, cleaners, detergents or a formulation for water treatment.

The molar ratio of citric acid to polyalcohol is 5.0:1.0 to 1.0:1.5. Preferably, the molar ratio of citric acid to polyalcohol is 3.5:1 to 1.0:1.5.

In a further preferred embodiment of the process according to the invention, hydrophobically modified branched polyesters are used.

Within the context of the present invention, hydrophobically modified branched polyesters are understood as meaning modified polyesters of citric acid and at least one polyhydroxyl compound and optionally one polycarboxylic acid in which the accessible hydroxyl and/or carboxyl groups have at least partially been further modified, i.e. have been reacted with reagents which alter the properties of the polyesters modified in this way. Properties in this connection are solubility, dispersibility and hydrophobicity.

The modification of the polyester preferably takes place with the polyesters according to the invention of citric acid and polyhydroxyl compounds, as are described above.

Hydrophobically modified branched polyesters of citric acid and polyhydroxyl compounds can be obtained by adding alkyl- or alkenylcarboxylic acids, alkyl or alkenyl alcohols, alkyl- or alkenylamines and/or aliphatic isocyanates during the condensation reaction or by means of a subsequent reaction.

The hydrophobically modified polyesters have proven to be advantageous for cleaning ware items heavily soiled with domestic fats. In addition, they can be converted easily into solid forms. In particular, the production of granules is facilitated by the hydrophobicization step.

Particular preference is given to the use of hydrophobically modified branched polyesters which are obtained by adding alkyl- or alkenylcarboxylic acids during the condensation reaction or in a subsequent reaction step.

In order to achieve an amphiphilic character, the highly functional, highly branched polyesters of citric acid and polyhydroxyl compounds (during the condensation reaction or subsequently) can also be reacted with hydrophobic and hydrophilic agents, for example with long-chain alkyl- or alkenylcarboxylic acids, alkyl or alkenyl alcohols, alkyl- or alkenylamines or isocyanates and simultaneously with mono-, di- or higher-functional alcohols, amines, acids or isocyanates having polyethylene glycol chains.

Hyperbranched polyesters are preferably suitable. Within the context of this invention, hyperbranched polyesters are understood as meaning uncrosslinked polyesters with hydroxyl and carboxyl groups which are both structurally and molecularly nonuniform. Within the context of this specification, uncrosslinked means that a degree of crosslinking of less than 15% by weight, preferably of less than 10% by weight, determined via the insoluble fraction of the polymer, is present.

Hyperbranched polyesters can on the one hand be formed starting from a central molecule analogously to dendrimers, but with nonuniform chain length of the branches. On the other hand, they can also have a linear structure, with functional side groups, or else, being a combination of the two extremes, have linear and branched molecular moieties. For the definition of dendrimers and hyperbranched polymers, see also P. J. Flory, J. Am. Chem. Soc. 1952, 74, 2718 and H. Frey et al., Chemistry—A European Journal, 2000, 6, No. 14, 2499.

In connection with the present invention, "hyperbranched" is understood as meaning that the degree of branching (DB) is 10 to 99.9%, preferably 20 to 99%, particularly preferably 20-95%. The degree of branching DB is defined here as DB $(\%)=(T+Z)/(T+Z+L)\times 100$, where T is the average number of terminally bonded monomer units, Z is the average number of monomer units forming branches, L is the average number of linearly bonded monomer units.

In connection with the present invention, "dendrimeric" is understood as meaning that the degree of branching is 99.9-100%. For the definition of the "Degree of Branching", see H. Frey et al., Acta Polym. 1997, 48, 30-35.

Component A

According to the invention, citric acid is understood as meaning citric acid anhydrate and also the hydrates of citric acid, such as, for example, citric acid monohydrate.

Component B

According to the invention, suitable polyalcohols are alcohols with at least two hydroxyl groups and up to six hydroxyl groups. Preferably, diols or triols or mixtures of different diols and/or triols are contemplated. Suitable polyalcohols are, for example, polyetherols. The polyetherols can be obtained by reaction with ethylene oxide, propylene oxide and/or butylene oxide. In particular, polyetherols based on ethylene oxide and/or propylene oxide are suitable. It is also possible to use mixtures of such polyetherols.

Suitable diols are, for example ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decandiol, 1,10-decandiol, 1,2-dodecandiol, 1,12-dodecandiol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, where n is an integer and n 4, polyethylene polypropylene glycols, where the sequence of the ethylene oxide of the propylene oxide units can be block-wise or random, polytetramethylene glycols, preferably up to a molecular weight up to 5000 g/mol, poly-1,3-propanediols, preferably with a molecular weight up to 5000 g/mol, polycaprolactones or mixtures of two or more representatives of the above compounds. For example, one to six, preferably one to four, particularly preferably one to three, very particularly preferably one to two and in particular one diol can be used. Here, one or both hydroxyl groups in the diols specified above can be substituted by SH groups. Diols preferably used are ethylene glycol, 1,2-propanediol, 1,3-propanediol, 1,4-butanediol, 1,5-pentanediol, 1,6-hexanediol, 1,8-octanediol, 1,2-, 1,3- and 1,4-cyclohexanediol, 1,3- and 1,4-bis(hydroxymethyl)cyclohexane, and diethylene glycol, triethylene glycol, dipropylene glycol, tripropylene glycol and polyethylene glycols with an average molecular weight between 200 and 1000 g/mol.

The dihydric polyalcohols can optionally also comprise further functionalities such as, for example, carbonyl, carboxyl, alkoxycarbonyl or sulfonyl, such as, for example, dimethylolpropionic acid or dimethylolbutyric acid, and C1-C4-alkyl esters thereof, although the alcohols preferably have no further functionalities.

Preferred diols are ethylene glycol, diethylene glycol and polyethylene glycol with an average molecular weight between 200 and 1000 g/mol.

Suitable triols or higher-functional polyalcohols are, for example, glycerol, trimethylolmethane, trimethylolethane, trimethylolpropane, bis(trimethylolpropane), trimethylolbutane, trimethylolpentane, 1,2,4-butanetriol, 1,2,6-hexanetriol, tris(hydroxymethyl)amine, tris(hydroxyethyl)amine, tris(hydroxypropyl)amine, pentaerythritol, diglycerol, triglycerol or higher condensation products of glycerol, di(trimethylolpropane), di(pentaerythritol), tris(hydroxymethyl) isocyanurate, tris(hydroxyethyl) isocyanurate (THEIC), tris(hydroxypropyl) isocyanurate and N-[1,3-bis(hydroxymethyl)-2,5-dioxo-4-imidazolidinyl]-N,N'-bis(hydroxymethyl)urea.

Preferred triols are trimethylolpropane, trimethylolethane, glycerol, diglycerol and triglycerol, and polyetherols thereof based on ethylene oxide and/or propylene oxide. Also suitable are furthermore sugars or sugar alcohols, such as, for example, glucose, fructose or sucrose, sugar alcohols such as e.g. sorbitol, mannitol, threitol, erythritol, adonitol (ribitol), arabitol (lyxitol), xylitol, dulcitol (galactitol), maltitol, isomalt, or inositol.

Also suitable are tri- or higher-functional polyetherols based on tri- or higher-functional alcohols which are obtained by reaction with ethylene oxide, propylene oxide and/or butylene oxide, or mixtures of such reaction products.

It is also possible to use mixtures of at least trifunctional polyalcohols. For example, one to six, preferably one to four, particularly preferably one to three, very particularly preferably one to two and in particular one at least trifunctional alcohol can be used.

In this connection, ethylene glycol, 1,2-propanediol, 1,3-propanediol, 1,4-butanediol, 1,5-pentanediol, 1,6-hexanediol, and diethylene glycol, triethylene glycol, dipropylene glycol, tripropylene glycol, polyethylene glycol with an average molecular weight between 200 and 1000 g/mol, glycerol, diglycerol, triglycerol, trimethylolpropane, trimethylolethane, di(trimethylolpropane), 1,2,4-butanetriol, 1,2,6-hexanetriol, pentaerythritol, sucrose, sorbitol or glucaric acid, and polyetherols thereof based on ethylene oxide and/or propylene oxide, or a mixture thereof are preferred as component B.

Particular preference is given to diethylene glycol or polyethylene glycol with an average molecular weight between 200 and 1000 g/mol, trimethylolpropane, glycerol or diglycerol, triglycerol, and polyetherols thereof based on ethylene oxide and/or propylene oxide, or a mixture thereof.

Component C

In addition to the citric acid, further carboxylic acids, in particular saturated dicarboxylic acids, can be condensed in, in which case the fraction of further polycarboxylic acids should be at most 30 mol % compared with the amount of citric acid used. Preferably, the polycarboxylic acids of component C comprise no sulfonate groups.

Suitable saturated dicarboxylic acids are, for example, aliphatic dicarboxylic acids, such as oxalic acid, malonic acid, succinic acid, glutaric acid, adipic acid, pimelic acid, suberic acid, azeleic acid, sebacic acid, undecane-$\alpha,\omega$-dicarboxylic acid, dodecane-$\alpha,\omega$-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid.

The specified saturated dicarboxylic acids can also be substituted with one or more radicals selected from
$C_1$-$C_{20}$-alkyl groups, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, trimethylpentyl, n-nonyl, n-decyl, n-dodecyl, n-tetradecyl, n-hexadecyl, n-octadecyl, or n-eicosyl,
$C_2$-$C_{20}$-alkenyl groups, for example butenyl, hexenyl, octenyl, decenyl, dodecenyl, tetradecenyl, hexadecenyl, octadecenyl or eicosenyl, $C_3$-$C_{12}$-cycloalkyl groups, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;
alkylene groups such as methylene or ethylidene or
$C_6$-$C_{14}$-aryl groups such as, for example, phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl.

Exemplary representatives of substituted dicarboxylic acids or derivatives thereof which may be mentioned are: 2-methylmalonic acid, 2-ethylmalonic acid, 2-phenylmalonic acid, 2-methylsuccinic acid, 2-ethylsuccinic acid, 2-phenylsuccinic acid, 3,3-dimethylglutaric acid, dodecenylsuccinic acid, hexadecenylsuccinic acid and octadecenylsuccinic acid.

The dicarboxylic acids can either be used as they are or in the form of derivatives.

Derivatives are preferably understood as meaning the relevant anhydrides in monomeric or else polymeric form, mono- or dialkyl esters, preferably mono- or di-$C_1$-$C_4$-alkyl esters, particularly preferably mono- or dimethyl esters or the corresponding mono- or diethyl esters, as well as mixed esters, preferably mixed esters with different $C_1$-$C_4$-alkyl components, particularly preferably mixed methyl ethyl esters.

Among these, preference is given to the anhydrides and the mono- or dialkyl esters, particularly preferably the anhydrides and the mono- or di-$C_1$-$C_4$-alkyl esters and very particularly preferably the anhydrides.

Within the context of this specification, $C_1$-$C_4$-alkyl means methyl, ethyl, isopropyl, n-propyl, n-butyl, isobutyl, sec-butyl and tert-butyl, preferably methyl, ethyl and n-butyl, particularly preferably methyl and ethyl and very particularly preferably methyl.

Particularly preferably, malonic acid, succinic acid, glutaric acid, adipic acid, sebacic acid, octadecenylsuccinic anhydride, 1,2-, 1,3- or 1,4-cyclohexanedicarboxylic acids (hexahydrophthalic acids as cis or trans compounds or mixtures thereof) are used.

Further preferred dicarboxylic acids are glucaric acid and tartaric acid.

The amount of dicarboxylic acid is not more than 30 mol % compared with the amount of citric acid used, preferably not more than 20%, very particularly preferably not more than 15%.

Component D

Suitable components D are alkyl- or alkenylcarboxylic acids, such as, for example, long-chain, linear or branched carboxylic acids having 6 to 30 carbon atoms, preferably 8 to 22 carbon atoms, in particular 10 to 18 carbon atoms, in the alkyl or alkenyl radical, such as octanoic acid, nonanoic acid, decanoic acid, undecanoic acid, dodecanoic acid, tridecanoic acid, tetradecanoic acid, hexadecanoic acid, arachic acid, behenic acid, palmitoleic acid, stearic acid, oleic acid, linoleic acid, linolenic acid, arachidonic acid or Li, Na, K, Cs, Ca or ammonium salts thereof.

It is also possible to use mixtures.

Preferably, oleic acid, palmitic acid, linoleic acid, stearic acid, lauric acid and ricinoleic acid are used.

The alkyl- or alkenylcarboxylic acids can also be used in the form of their carboxylic acid alkyl esters. Preference is given to using the methyl esters.

Suitable long-chain alcohols are, for example, linear or branched alcohols having 6 to 30 carbon atoms, preferably 8 to 22 carbon atoms, in particular 10 to 18 carbon atoms in the linear or branched alkyl radical, such as octan-1-ol, decan-1-ol, lauryl alcohol, myristyl alcohol, cetyl alcohol, stearyl alcohol, eicosanol, behenyl alcohol, 9-hexadecen-1-ol and 9-octadecen-1-ol.

Preference is given to using lauryl alcohol and stearyl alcohol.

Exemplary representatives of alkyl- or alkenylamines which may be mentioned are: linear or branched alkylamines having 6 to 30 carbon atoms, preferably 8 to 22 carbon atoms, in particular 10 to 18 carbon atoms, in the linear or branched alkyl radical, such as hexylamine, octylamine, nonylamine, decylamine, dodecylamine, tetradecylamine, hexadecylamine, octadecylamine and mixtures thereof.

Suitable long-chain isocyanates are linear or branched isocyanates having 6 to 30 carbon atoms, preferably 8 to 22 carbon atoms, in particular 10 to 18 carbon atoms, in the linear or branched alkyl radical, such as octyl isocyanate, dodecyl isocyanate, stearic isocyanate and mixtures thereof.

The molar ratio of (component A+component B) to component D is preferably 10:0.1 to 0.5:0.1, particularly preferably 5:0.1 to 1:0.1.

The present invention further provides hydrophobicized branched polyesters as described above and the process for the preparation thereof.

Preparation Process

The process for preparing the branched polyesters based on citric acid can be carried out without dilution or in the presence of an organic solvent. Suitable solvents are, for example, hydrocarbons such as paraffins or aromatics. Particularly suitable paraffins are n-heptane and cyclohexane. Particularly suitable aromatics are toluene, ortho-xylene, meta-xylene, para-xylane, xylene as isomer mixture, ethylbenzene, chlorobenzene and ortho- and meta-dichlorobenzene. Furthermore, suitable solvents in the absence of acidic catalysts are very particularly ethers, such as, for example, dioxane or tetrahydrofuran, and ketones such as, for example, methyl ethyl ketone and methyl isobutyl ketone.

The amount of added solvent is at least 0.1% by weight, based on the mass of the starting materials used and to be reacted, preferably at least 1% by weight and particularly preferably at least 10% by weight. It is also possible to use excesses of solvent, based on the mass of starting materials used and to be reacted, for example 1.01- to 10-fold.

Preferably, the reaction is carried out without addition of solvent.

To carry out the process, it is possible to work in the presence of a water-withdrawing agent as additive, which is added at the start of the reaction. Of suitability are, for example, molecular sieves, in particular 4 Å molecular sieve, $MgSO_4$ and $Na_2SO_4$.

During the reaction, it is also possible to add further water-withdrawing agent or to replace water-withdrawing agent with fresh water-withdrawing agent. During the reaction, it is also possible to distill off water and/or alcohol that is formed and, for example, to use a water separator, in which the water is removed with the help of an entrainer.

Preferably, the process is carried out in the absence of catalysts.

However, it is also possible to carry out the process in the presence of at least one catalyst. As preferred catalysts may acidic inorganic, organometallic or organic catalysts or mixtures of two or more acidic inorganic, organometallic or organic catalysts.

Within the context of this specification, acidic catalysts are considered to be Lewis acids, i.e. those compounds according to Römpps Chemie-Lexikon, under "Säure-Base-Begriff" [Acids and Bases], which can accept an electron pair into the valence shell of one of their atoms.

Acidic inorganic catalysts to be mentioned are, for example, sulfuric acid, sulfates and hydrogensulfates, such as sodium hydrogensulfate, phosphoric acid, phosphonic acid, hydrophosphorous acid, aluminum sulfate hydrate, alum, acidic silica gel (pH≤6, in particular≤5) and acidic aluminum oxide. Furthermore, it is possible to use, for example, aluminum compounds of the general formula $Al(OR^1)_3$ and titanates of the general formula $Ti(OR^1)_4$ as acidic inorganic catalysts, where the radicals $R^1$ may in each case be identical or different and, independently of one another, are selected from $C_1$-$C_{20}$-alkyl radicals, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl, $C_3$-$C_{12}$-cycloalkyl radicals, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

Preferably, the radicals $R^1$ in $Al(OR^1)_3$ and $Ti(OR^1)_4$ are in each case identical and selected from n-butyl, isopropyl, 2-ethylhexyl, n-octyl, decyl or dodecyl.

Preference is given to using titanium(IV) tetrabutoxide.

Preferred acidic organometallic catalysts are selected for example from dialkyltin oxides $(R^1)_2SnO$ or dialkyltin diesters $(R^1)_2Sn(OR^2)_2$, where $R^1$ is as defined above and can be identical or different.

$R^2$ can have the same meanings as $R^1$ and additionally be $C_6$-$C_{12}$-aryl, for example phenyl, o-, m- or p-tolyl, xylyl or naphthyl. $R^2$ can in each case be identical or different.

Examples are of organotin catalysts are tin(II) n-octanoate, tin(II) 2-ethylhexanoate, tin(II) laurate, dibutyltin oxide, diphenyltin oxide, dibutyltin dichloride, dibutyltin diacetate, dibutyltin dilaurate, dibutyltin dimaleate or dioctyltin diacetate. Organoantimony, organobismuth or organoaluminum catalysts are also conceivable.

Particularly preferred representatives of acidic organometallic catalysts are dibutyltin oxide, diphenyltin oxide and dibutyltin dilaurate.

Preferred acidic organic catalysts are acidic organic compounds with, for example, phosphate groups, sulfonic acid groups, sulfate groups or phosphonic acid groups. Particular preference is given to sulfonic acids such as, for example, para-toluenesulfonic acid. It is also possible to use acidic ion exchangers as acidic organic catalysts, for example sulfonic acid-group-containing polystyrene resins which have been crosslinked with about 2 mol % of divinylbenzene.

Combinations of two or more of the aforementioned catalysts can also be used. It is also possible to use those organic or organometallic or else inorganic catalysts which are present in the form of discrete molecules, in immobilized form, for example on silica gel or on zeolites.

If it is desired to use acidic inorganic, organometallic or organic catalysts, then the amount used is preferably 1 to 10 000 ppm by weight of catalyst, particularly preferably 2 to 5000 ppm by weight, based on the total mass of the hydroxyl group- and the carboxyl group-containing compounds.

If it is desired to use acidic inorganic, organometallic or organic catalysts, then the process is carried out at temperatures from 60 to 140° C. Preference is given to working at temperatures of from 80 to 140, particularly preferably at 100 to 130° C.

It is also possible to use enzymes as catalysts, although their use is less preferred.

Enzymes which can be used for this purpose are selected, for example, from hydrolases (E.C. 3.-.-.-), and among these particularly from the esterases (E.C. 3.1.-.-), lipases (E.C. 3.1.1.3), glycosylases (E.C. 3.2.-.-) and proteases (E.C. 3.4.-.-), in free form or in a form immobilized physically or chemically on a support, preferably lipases, esterases or proteases and particularly preferably esterases (E.C. 3.1.-.-). Very particular preference is given to Novozyme 435 (lipase from *Candida antarctica* B) or lipase from *Alcaligenes* sp., *Aspergillus* sp., *Mucor* sp., *Penicilium* sp., *Geotricum* sp., *Rhizopus* sp., *Burkholderia* sp., *Candida* sp., *Pseudomonas* sp., *Thermomyces* sp. or porcine pancreas, particular preference being given to lipase from *Candida antarctica* B or from *Burkholderia* sp.

The enzyme content in the reaction medium is generally in the range from about 0.1 to 10% by weight, based on the sum of the components used.

If it is desired to use enzymes as catalyst, then the process is carried out at temperatures from 20 and up to 120° C., preferably 20 to 100° C. and particularly preferably not more than 20-80° C.

The process is preferably carried out under inert-gas atmosphere, i.e. a gas which is inert under the reaction conditions, for example under carbon dioxide, combustion gases, nitrogen or noble gases, among which argon in particular is to be mentioned.

The process is carried out at temperatures of from 60 to 140° C. Preference is given to working at temperatures of from 80 to 140, particularly preferably at 100 to 130° C.

The pressure conditions of the process are generally not critical. It is possible to work at significantly reduced pressure, for example at 10 to 500 mbar. The process can also be carried out at pressures above 500 mbar. For reasons of simplicity, the reaction is preferably at atmospheric pressure; however, an implementation at slightly elevated pressure, for example up to 1200 mbar, is also possible. It is also possible to work under significantly increased pressure, for example at pressures up to 10 bar. Preferably, the reaction is at reduced pressure or atmospheric pressure, particularly preferably at atmospheric pressure.

The reaction time of the process is usually 10 minutes to 5 days, preferably 30 minutes to 48 hours and particularly preferably 1 to 12 hours.

When the reaction is complete, the highly functional branched polyesters can be isolated easily, for example by filtering off the catalyst and optionally stripping off the solvent, the stripping-off of the solvent usually being carried out at reduced pressure. Further highly suitable work-up methods are precipitation of the polymer following the addition of water and subsequent washing and drying.

If required, the reaction mixture can be subjected to a decolorization, for example by treatment with activated carbon or metal oxides, such as e.g. aluminum oxide, silicon oxide, magnesium oxide, zirconium oxide, boron oxide or mixtures thereof, in amounts of, for example, 0.1-50% by weight, preferably 0.5 to 25% by weight, particularly preferably 1-10% by weight, at temperatures of, for example, 10 to 140° C., preferably 20 to 130° C. and particularly preferably 30 to 120° C.

This can take place by adding the pulverulent or granular decolorizing agent to the reaction mixture and subsequent filtration, or by passing the reaction mixture over a bed of a decolorizing agent in the form of any desired suitable shaped bodies.

The decolorization of the reaction mixture can take place at any desired point in the work-up process, for example at the stage of the crude reaction mixture or following optional prewashing, neutralization, washing or solvent removal.

The reaction mixture can furthermore be subjected to a prewashing and/or a neutralization and/or a post-washing, preferably only to a neutralization. Optionally, the order of neutralization and prewashing can also be swapped.

From the aqueous phase of the washing and/or neutralization it is possible to recover, at least partially, any valuable products present by means of acidification and extraction with a solvent, and to use them afresh.

In terms of processing, all extraction and washing processes and apparatuses known per se can be used for a washing or neutralization in the process, e.g. those which are described in Ullmann's Encyclopedia of Industrial Chemistry, 6th ed, 1999 Electronic Release, Chapter: Liquid—Liquid Extraction—Apparatus. For example, these may be single-stage or multi-stage, preferably single-stage, extractions, and also those in cocurrent or countercurrent mode, preferably countercurrent mode.

However, in one preferred embodiment, it is possible to dispense with a washing, neutralization and decolorization.

The branched polyesters have molecular weights $M_n$ of from 400 to 5000 g/mol, preferably 400 to 3000 g/mol, particularly preferably from 500 to 2500 g/mol, and molecular weights $M_w$ of from 500 to 50 000 g/mol, preferably 700 to 25 000 g/mol, particularly preferably 700 to 15 000.

The molecular weights of the branched polyesters were determined by gel permeation chromatography (GPC) (eluent: THF; standard: PMMA, detector: refractive index detector).

The branched polyesters have acid numbers of from 60 to 600 mg KOH/g of polymer, preferably 80 to 500 mg KOH/g of polymer and very particularly preferably 100 to 450 mg KOH/g of polymer. The acid numbers were determined in accordance with DIN 53402.

The branched polyesters have glass transition temperatures in the range from −50 to +50° C., preferably −40 to +40° C. and very particularly preferably −30 to +40° C. The glass transition temperature is determined by means of DSC (Differential Scanning calorimetry) at a heating rate of 20 K/min.

Cleaner Formulations

A further embodiment of the invention is given by mixtures of the branched polyesters according to the invention. Besides the branched polyesters of the invention, such mixtures comprise further constituents such as solvents or surfactants.

These mixtures are preferably cleaners, washing compositions or detergents or mixtures for water treatment. The branched polyesters of the invention can be incorporated directly into the formulations (mixtures) in their various presentation forms by processes known to the person skilled in the art. In this connection, solid formulations such as powders, tablets and liquid formulations are to be mentioned.

The invention therefore further provides the use of the branched polyesters according to the invention, or mixtures thereof, in washing compositions, cleaners or detergents, in particular in dishwashing compositions.

They can be used particularly advantageously in machine dishwashing compositions. They are characterized here in particular by their deposit-inhibiting effect both towards inorganic and organic deposits. In particular, they inhibit deposits of calcium and magnesium carbonate and calcium and magnesium phosphates and phosphonates. Additionally, they prevent deposits which originate from the soil constituents of the wash liquor, such as grease, protein and starch deposits.

The machine cleaning formulations according to the invention can be provided in liquid or solid form, in one or more phases, as tablets or in the form of other dosage units, packaged or unpackaged.

The branched polyesters can be used either in multicomponent product systems (separate use of detergent, rinse aid and regenerating salt) or in those dishwashing compositions in which the functions of detergent, rinse aid and regenerating salt are combined in one product (3-in-1 products, 6-in-1 products, 9-in-1 products, all-in-one products).

A preferred embodiment of the mixtures according to the invention is given by a cleaning formulation for machine dishwashing comprising as components:

a) 1 to 20% by weight of at least one polymer according to the invention, b) 0 to 50% by weight of complexing agents, c) 0 to 70% by weight of phosphates,
d) 0 to 60% by weight of further builders and cobuilders,
e) 0.1 to 20% by weight of nonionic surfactants,
f) 0.1 to 30% by weight of bleaches and optionally bleach activators,
g) 0 to 8% by weight of enzymes,
h) 0 to 50% by weight of one or more further additives such as anionic or zwitterionic surfactants, bleach catalysts, alkali carriers, polymeric dispersants, corrosion inhibitors, antifoams, dyes, fragrances, fillers, tablet disintegrants, organic solvents, tableting auxiliaries, disintegrants, thickeners, solubility promoters and water, where the sum of components a) to h) is 100% by weight.

As component b), the cleaning formulations according to the invention can comprise one or more complexing agents. Preferred complexing agents are selected from the group consisting of nitrilotriacetic acid, ethylenediaminetetraacetic acid, diethylenetriaminepentaacetic acid, hydroxyethylethylenediaminetriacetic acid and methylglycinediacetic acid, glutamic acid diacetic acid, iminodisuccinic acid, hydroxyiminodisuccinic acid, ethylenediaminedisuccinic acid, aspartic acid diacetic acid, and salts thereof. Particularly preferred complexing agents b) are methylglycinediacetic acid and salts thereof.

As component c), the cleaner according to the invention can comprise phosphates. If the cleaner comprises phosphates, it generally comprises these in amounts of from 1 to 70% by weight, preferably from 5 to 60% by weight, particularly preferably from 20 to 55% by weight.

Among the large number of commercially available phosphates, the alkali metal phosphates, particularly preferably pentasodium or pentapotassium triphosphate (sodium or potassium tripolyphosphate), are of the greatest importance in the detergents and cleaners industry.

Of suitability as phosphates for dishwashing compositions are in particular alkali metal-phosphates and polymeric alkali metal phosphates, which may be present in the form of their alkaline, neutral or acidic sodium or potassium salts. Examples of phosphates of this type are trisodium phosphate, tetrasodium diphosphate, disodium dihydrogendiphosphate, pentasodium tripolyphosphate, so-called sodium hexametaphosphate, oligomeric trisodium phosphate with a degree of oligomerization of from 5 to 1000, preferably 5 to 50, and the corresponding potassium salts, or mixtures of sodium hexametaphosphate and the corresponding potassium salts, or mixtures of the sodium and potassium salts. Tripolyphosphate salts are particularly preferred. These are used in amounts of from 30 to 65% by weight, preferably 35 to 60% by weight, expressed as water-free active substance and based on the total cleaning formulation.

As component d), the cleaner according to the invention can comprise builders and cobuilders. Builders and cobuilders are water-soluble or water-insoluble substances whose main task consists in the binding of calcium and magnesium ions.

These may be low molecular weight carboxylic acids and salts thereof such as alkali metal citrates, in particular anhydrous trisodium citrate or trisodium citrate dihydrate, alkali metal succinates, alkali metal malonates, fatty acid sulfonates, oxydisuccinate, alkyl- or alkenyldisuccinates, gluconic acids, oxadiacetates, carboxymethyloxysuccinates, tartrate monosuccinate, tartrate disuccinate, tartrate monoacetate, tartrate diacetate and α-hydroxypropionic acid.

A further substance class with cobuilder properties which may be present in the cleaners according to the invention is that of the phosphonates. These are in particular hydroxyalkane- and aminoalkanephosphonates. Among the hydroxyalkanephosphonates, 1-hydroxyethane-1,1-diphosphonate (HEDP) is of particular importance as cobuilder. It is preferably used as sodium salt, the disodium salt being neutral and the tetrasodium salt alkaline (pH 9). Suitable aminoalkanephosphonates are preferably ethylenediaminetetramethylenephosphonate (EDTMP), diethylenetriaminepentamethylenephosphonate (DTPMP), and higher homologs thereof. They are preferably used in the form of the neutral sodium salts, e.g. as hexasodium salt of EDTMP or as hepta- and octasodium salt of DTPMP. As builder, preferably HEDP is used here from the class of phosphonates. The aminoalkanephosphonates moreover have a pronounced heavy metal binding capacity. Accordingly, especially if the compositions also comprise bleaches, it may be preferred to use aminoalkanephosphonates, in particular DTPMP, or to use mixtures of the specified phosphonates.

A further substance class in the builder system is that of the silicates. Crystalline sheet silicates with the general formula $NaMSi_xO_{2x+1} \cdot yH_2O$ may be present, where M is sodium or hydrogen, x is a number from 1.9 to 22, preferably from 1.9 to 4, where particularly preferred values for x are 2, 3 or 4 and y is a number from 0 to 33, preferably 0 to 20. In addition, amorphous sodium silicates with an $SiO_2:Na_2O$ ratio of 1 to 3.5, preferably from 1.6 to 3 and in particular from 2 to 2.8, can be used.

Furthermore, carbonates and hydrogencarbonates are used, of which the alkali metal salts, in particular sodium salts, are preferred. Preferred amounts are 5 to 50% by weight, particularly preferably 10 to 40% by weight and in particular 15 to 30% by weight.

As component e), the cleaning formulations according to the invention comprise weakly foaming or low-foam nonionic surfactants. These are generally present in fractions of from 0.1 to 20% by weight, preferably from 0.1 to 15% by weight, particularly preferably from 0.25 to 10% by weight.

Suitable nonionic surfactants comprise the surfactants of the general formula (III)

$$R^{18}-O-(CH_2CH_2O)_p-(CHR^{17}CH_2O)_m-R^{19} \quad \text{(III)}$$

in which $R^{18}$ is a linear or branched alkyl radical having 8 to 22 carbon atoms, $R^{17}$ and $R^{19}$, independently of one another, are hydrogen or a linear or branched alkyl radical having 1-10 carbon atoms or H, where $R^{17}$ is preferably methyl, p and m, independently of one another, are 0 to 300. Preferably, p=1-100 and m=0-30.

The surfactants of the formula (III) may either be random copolymers or block copolymers, preference being given to block copolymers.

Furthermore, di- and multiblock copolymers, formed from ethylene oxide and propylene oxide, can be used, which are commercially available for example under the name Pluronic® (BASF SE) or Tetronic® (BASF Corporation). Furthermore, reaction products of sorbitan esters with ethylene oxide and/or propylene oxide can be used. Likewise of suitability of amine oxides or alkyl glycosides. An overview of suitable nonionic surfactants is given in EP-A 851 023 and DE-A 198 19 187.

Mixtures of two or more different nonionic surfactants may also be present.

The formulations can also comprise anionic or zwitterionic surfactants, preferably in a mixture with nonionic surfactants. Suitable anionic and zwitterionic surfactants are likewise specified in EP-A 851 023 and DE-A 198 19 187.

As component f), the cleaning formulations according to the invention can comprise bleaches and optionally bleach activators.

Bleaches are subdivided into oxygen bleaches and chlorine-containing bleaches. Alkali metal perborates and hydrates thereof, and also alkali metal percarbonates, are used as oxygen bleaches. Preferred bleaches here are sodium perborate in the form of the mono- or tetrahydrate, sodium percarbonate or the hydrates of sodium percarbonate.

Persulfates and hydrogen peroxide can likewise be used as oxygen bleaches.

Typical oxygen bleaches are also organic peracids, such as, for example, perbenzoic acid, peroxy-alpha-naphthoic acid, peroxylauric acid, peroxystearic acid, phthalimidoperoxycaproic acid, 1,12-diperoxydodecanedioic acid, 1,9-diperoxyazeleic acid, diperoxoisophthalic acid or 2-decyldiperoxybutane-1,4-dioic acid.

Moreover, the following oxygen bleaches may also be used in the cleaner formulation:

Cationic peroxy acids which are described in the patent applications U.S. Pat. No. 5,422,028, U.S. Pat. No. 5,294,362 and U.S. Pat. No. 5,292,447, and sulfonyl peroxy acids which are described in the patent application U.S. Pat. No. 5,039,447.

Oxygen bleaches are used in amounts of in general 0.5 to 30% by weight, preferably from 1 to 20% by weight, particularly preferably from 3 to 15% by weight, based on the total cleaner formulation.

Chlorine-containing bleaches and the combination of chlorine-containing bleaches with peroxide-containing bleaches can likewise be used. Known chlorine-containing bleaches are, for example, 1,3-dichloro-5,5-dimethylhydantoin, N-chlorosulfamide, chloramine T, dichloramine T, chloramine B, N,N'-dichlorobenzoylurea, p-toluenesulfonedichloroamide or trichloroethylamine. Preferred chlorine-containing bleaches are sodium hypochlorite, calcium hypochlorite, potassium hypochlorite, magnesium hypochlorite, potassium dichloroisocyanurate or sodium dichloroisocyanurate.

Chlorine-containing bleaches are used in amounts of in general 0.1 to 20% by weight, preferably from 0.2 to 10% by weight, particularly preferably from 0.3 to 8% by weight, based on the total cleaner formulation.

Furthermore, bleach stabilizers such as, for example, phosphonates, borates, metaborates, metasilicates or magnesium salts can be added in small amounts. Bleach activators are compounds which, under perhydrolysis conditions, produce aliphatic peroxocarboxylic acids having preferably 1 to 10 carbon atoms, in particular 2 to 4 carbon atoms, and/or substituted perbenzoic acid. Compounds which comprise one or more N- or O-acyl groups and/or optionally substituted benzoyl groups, for example substances from the class of anhydrides, esters, imides, acylated imidazoles or oximes, are suitable. Examples are tetraacetylethylenediamine (TAED), tetraacetylmethylenediamine (TAM D), tetraacetylglycoluril (TAGU), tetraacetylhexylenediamine (TAHD), N-acylimides, such as, for example, N-nonanoylsuccinimide (NOSI), acylated phenolsulfonates, such as, for example, n-nonanoyl- or isononanoyloxybenzenesulfonates (n- or iso-NOBS), pentaacetylglucose (PAG), 1,5-diacetyl-2,2-dioxohexahydro-1,3,5-triazine (DADHT) or isatoic anhydride (USA). Likewise suitable as bleach activators are nitrile quats such as, for example, N-methylmorpholinioacetonitrile salts (MMA salts) or trimethylammonioacetonitrile salts (TMAQ salts).

Preferably, bleach activators from the group consisting of polyacylated alkylenediamines, particularly preferably TAED, N-acylimides, particularly preferably NOSI, acylated phenolsulfonates, particularly preferably n- or iso-NOBS, MMA and TMAQ are suitable.

Bleach activators are used in amounts of in general 0.1 to 10% by weight, preferably from 1 to 9% by weight, particularly preferably from 1.5 to 8% by weight, based on the total cleaner formulation.

In addition to the conventional bleach activators, or instead of them, so-called bleach catalysts can also be incorporated into the rinse-aid particles. These substances are bleach-boosting transition metal salts or transition metal complexes such as, for example, manganese-, iron-, cobalt-, ruthenium- or molybdenum-salen complexes or -carbonyl complexes. It is also possible to use manganese, iron, cobalt, ruthenium, molybdenum, titanium, vanadium and copper complexes with nitrogen-containing tripod ligands, as well as cobalt-, iron-, copper- and ruthenium-amine complexes as bleach catalysts.

As component g), the cleaning formulations according to the invention can comprise enzymes. Between 0 and 8% by weight of enzymes, based on the total preparation, can be added to the cleaner in order to increase the performance of the cleaner or to ensure the same quality of cleaning performance under milder conditions. The enzymes used most often include lipases, amylases, cellulases and proteases. Furthermore, esterases, pectinases, lactases and peroxidases, for example, can also be used.

The cleaners according to the invention can moreover comprise, as component i), further additives such as anionic or zwitterionic surfactants, bleach catalysts, alkali carriers, corrosion inhibitors, antifoams, dyes, fragrances, fillers, tablet disintegrants, organic solvents and water.

Furthermore, the cleaners according to the invention can comprise 0 to 50% by weight of one or more further additives such as alkali carriers, corrosion inhibitors, antifoams, dyes, fragrances, fillers, organic solvents, tableting auxiliaries, disintegrants, solubility promoters and water.

As further constituents of the cleaner formulation, alkali carriers may be present. Besides the ammonium or alkali metal carbonates, ammonium or alkali metal hydrogencarbonates and ammonium or alkali metal sesquicarbonates already specified among the builder substances, it is also possible to use ammonium or alkali metal hydroxides, ammonium or alkali metal silicates and ammonium or alkali metal metasilicates, and mixtures of the aforementioned substances, as alkali carriers.

As corrosion inhibitors, silver anticorrosives from the group of triazoles, benzotriazoles, bisbenzotriazoles, aminotriazoles, alkylaminotriazoles and transition metal salts or complexes can be used.

To prevent glass corrosion, which is evident from clouding, iridescence, streaking and lines on the glasses, glass corrosion inhibitors are used. Preferred glass corrosion inhibitors are from the group of magnesium, zinc and bismuth salts and complexes.

Paraffin oils and silicone oils can optionally be used as antifoams and for protecting plastic and metal surfaces. Antifoams are generally used in fractions of from 0.001% by weight to 5% by weight. Moreover, dyes such as, for example, patent blue, preservatives such as, for example, Kathon CG, perfumes and other fragrances can be added to the cleaning formulation according to the invention.

A suitable filler is, for example, sodium sulfate.

The invention further provides the use of the branched polyesters according to the invention and mixtures thereof as scale inhibitors in water-conveying systems.

Water-conveying systems in which the polymers according to the invention can be used are processes for water treatment, in particular seawater and brackish water desalination plants, cooling water systems and boiler feed water systems and industrial process waters. The desalination plants can be thermal in nature or be based on membrane processes such as reverse osmosis or electrodialysis.

In general, the polymers according to the invention are added to the water-conveying systems in amounts of from 0.1 mg/l to 100 mg/l. The optimum dosage is governed by the requirements of the particular application and/or by the operating conditions of the respective process. For example, the polymers are preferably used in concentrations of from 0.5 mg/l to 10 mg/l in the case of thermal seawater desalination. In industrial cooling circuits or boiler feed water systems, polymer concentrations up to 100 mg/l are used. Often, water analyses are carried out in order to ascertain the fraction of scale-forming salts and thus the optimum dosage.

It is also possible to add to the water-conveying systems formulations which, besides the polymers according to the invention, can comprise according to requirements, inter alia, phosphonates, polyphosphates, zinc salts, molybdate salts, organic corrosion inhibitors such as benzotriazole, tolyltriazole, benzimidazole or ethynylcarbinol alkoxylates, biocides, complexing agents and/or surfactants. Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP), diethylenetriaminepenta(methylenephosphonic acid) (DTPMP) and ethylenediaminetetra(methylenephosphonic acid) (EDTMP), which are used in each case in acid form or in the form of their sodium salts.

The present invention provides branched polyesters which can be used for cleaning purposes and for the purpose of water treatment and are nevertheless biodegradable. These polymeric effect substances, which have a low toxicity, can be prepared by means of a technically relatively simple and cost-effective process and can be readily incorporated into formulations for cleaning purposes in their various presentation forms.

The invention is further illustrated by the examples, without the examples limiting the subject matter of the invention.

EXAMPLES

Preparation of the Polyesters According to the Invention

General Remarks:

The molecular weights were determined by gel permeation chromatography (GPC) (eluent: THF; standard: PMMA; detector: refractive index detector).

The acid numbers (mg KOH/g of polymer) were determined in accordance with DIN 53402.

TMP is understood as meaning trimethylolpropane.

TMP×n EO is understood as meaning trimethylolpropane alkoxylated with n mol of ethylene oxide, where n can be an average value (number-average).

PEG 200 is understood as meaning a polyethylene glycol with an average molecular weight of 200 g/mol.

Polyglycerol 3 is understood as meaning triglycerol.

Polymer 1: Polycondensate of Citric Acid Monohydrate/TMP 1.5:1.0

A 500 ml round-bottomed flask equipped with stirrer, internal thermometer, gas inlet tube and descending condenser with collecting vessel was charged with 210.4 g (1.00 mol) of citric acid monohydrate and 89.6 g (0.67 mol) of TMP, and 0.1 g (400 ppm) of titanium(IV) tetrabutoxide. Under nitrogen gassing, the mixture was heated to 130° C. and held at this temperature for 2 h with stirring, during which water of reaction and water of crystallization that was liberated was separated off via the descending condenser. The reaction was then ended by cooling to room temperature. The product was obtained in the form of a yellow water-soluble resin.

The following characteristic data were determined:
Acid number=345 mg KOH/g of polymer
$M_n$=570 g/mol, $M_w$=2580 g/mol
Polymer 2: Polycondensate of Citric Acid Monohydrate/TMP 2.0:1.0

A 500 ml round-bottomed flask equipped with stirrer, internal thermometer, gas inlet tube and descending condenser with collecting vessel was charged with 151.6 g (0.77 mol) of citric acid monohydrate and 48.8 g (0.37 mol) of TMP, and 0.06 g (300 ppm) of titanium(IV) tetrabutoxide. Under nitrogen gassing, the mixture was heated to 130° C. and held at this temperature for 2 h with stirring, during which water of reaction and water of crystallization that was liberated was separated off via the descending condenser. The reaction was then ended by cooling to room temperature. The product was obtained in the form of a yellow water-soluble resin.

The following characteristic data were determined:
Acid number=398 mg KOH/g of polymer
$M_n$=550 g/mol, $M_w$=3990 g/mol
Polymer 3: Polycondensate of Citric Acid Monohydrate/TMP/TMP×12.2 EO 1.7:0.5:0.5

A 500 ml round-bottomed flask equipped with stirrer, internal thermometer, gas inlet tube and descending condenser with collecting vessel was charged with 141.1 g (0.67 mol) of citric acid monohydrate, 132.4 g (0.20 mol) of TMP×12 EO and 26.5 g (0.20 mol) of TMP, and 0.1 g (400 ppm) of titanium(IV) tetrabutoxide. Under nitrogen gassing, the mixture was heated to 130° C. and held at this temperature for 2.5 h with stirring, during which water of reaction and water of crystallization that was liberated was separated off via the descending condenser. The reaction was then ended by cooling to room temperature.

The product was obtained in the form of a yellow water-soluble resin.

The following characteristic data were determined:
Acid number=262 mg of KOH/g of polymer
$M_n$=1170 g/mol, $M_w$=2260 g/mol
Polymer 4: Polycondensate of citric acid monohydrate/polyglycerol 3-3.0:1.0

A 500 ml round-bottomed flask equipped with stirrer, internal thermometer, gas inlet tube and descending condenser with collecting vessel was charged with 217.4 g (1.03 mol) of citric acid monohydrate and 82.4 g (0.34 mol) of polyglycerol 3, and 0.015 g (50 ppm) of sulfuric acid. Under nitrogen gassing, the mixture was heated to 130° C. and held at this temperature for 4 h with stirring, during which water of reaction and water of crystallization that was liberated was separated off via the descending condenser. The reaction was then ended by cooling to room temperature.

The product was obtained in the form of a yellow water-soluble resin.

The following characteristic data were determined:
Acid number=428 mg of KOH/g of polymer
$M_n$=1320 g/mol, $M_w$=1600 g/mol
Polymer 5: Polycondensate of Citric Acid Monohydrate/Polyglycerol 3/TMP 4.0:1.0:1.0

A 500 ml round-bottomed flask equipped with stirrer, internal thermometer, gas inlet tube and descending condenser with collecting vessel was charged with 207.5 g (1.00 mol) of citric acid monohydrate, 59.3 g (0.25 mol) of polyglycerol 3 and 33.1 (0.25 mol) of TMP, and 0.1 g (400 ppm) of titanium(IV) tetrabutoxide. Under nitrogen gassing, the mixture was heated to 130° C. and held at this temperature for 3.5 h with stirring, during which water of reaction and water of crystallization that was liberated was separated off via the descending condenser. The reaction was then ended by cooling to room temperature.

The product was obtained in the form of a yellow water-soluble resin.

The following characteristic data were determined:
Acid number=378 mg of KOH/g of polymer
$M_n$=520 g/mol, $M_w$=700 g/mol Polymer 6: Polycondensate of Citric Acid Monohydrate/Diethylene Glycol/TMP 1.7:0.5:0.5 (Without Cat.)

A 500 ml round-bottomed flask equipped with stirrer, internal thermometer, gas inlet tube and descending condenser with collecting vessel was charged with 224.5 g (1.07 mol) of citric acid monohydrate, 33.3 g (0.31 mol) of diethylene glycol and 42.2 g (0.31 mol) of TMP. Under nitrogen gassing, the mixture was heated to 130° C. and held at this temperature for 2.0 h with stirring, during which water of reaction and water of crystallization that was liberated was separated off via the descending condenser. The reaction was then ended by cooling to room temperature.

The product was obtained in the form of a dark yellow water-soluble resin. The following characteristic data were determined:
Acid number=412 mg of KOH/g of polymer
$M_n$=1300 g/mol, $M_w$=3500 g/mol Polymer 7: Polycondensate of Citric Acid Monohydrate/TMP/PEG 200 1.7:0.5:0.5 (Without Cat.)

A 1000 ml round-bottomed flask equipped with stirrer, internal thermometer, gas inlet tube and descending condenser with collecting vessel was charged with 204.4 g (0.97 mol) of citric acid monohydrate, 57.2 g (0.29 mol) of PEG 200 and 38.4 g (0.29 mol) of TMP. Under nitrogen gassing, the mixture was heated to 130° C. and held at this temperature for 8 h with stirring, during which water of reaction and water of crystallization that was liberated was separated off via the descending condenser. The reaction was then ended by cooling to room temperature.

The product was obtained in the form of a yellow water-soluble resin.

The following characteristic data were determined:
Acid number=347 mg of KOH/g of polymer
$M_n$=890 g/mol, $M_w$=2700 g/mol Polymer 8: Polycondensate of Citric Acid Monohydrate/TMP/Oleic Acid 1.5:1.0:0.2 (Without Cat.)

A 1000 ml round-bottomed flask equipped with stirrer, internal thermometer, gas inlet tube and descending condenser with collecting vessel was charged with 186.9 g (0.88 mol) of citric acid monohydrate, 79.6 g (0.593 mol) of trimethylolpropane and 33.5 g of oleic acid (0.119 mol). Under nitrogen gassing, the mixture was heated to 130° C. and held at this temperature for 2 h with stirring, during which water of reaction and water of crystallization that was liberated was separated off via the descending condenser. The reaction was then ended by cooling to room temperature.

The product was obtained in the form of a yellow water-soluble resin.

The following characteristic data were determined:
Acid number=321 mg of KOH/g of polymer
$M_n$=1400 g/mol, $M_w$=2800 g/mol Polymer 9: Polycondensate of Citric Acid Monohydrate/TMP/Oleic Acid 1.5:0.5:0.1 (without cat.)

A 1000 ml round-bottomed flask equipped with stirrer, internal thermometer, gas inlet tube and descending condenser with collecting vessel was charged with 186.9 g (0.88 mol) of citric acid monohydrate, 79.6 g (0.593 mol) of trimethylolpropane and 16.75 g of oleic acid (0.06 mol). Under nitrogen gassing, the mixture was heated to 130° C. and held at this temperature for 2 h with stirring, during which water of reaction and water of crystallization that was liberated was separated off via the descending condenser. The reaction was then ended by cooling to room temperature.

The product was obtained in the form of a yellow water-soluble resin.

The following characteristic data were determined:
Acid number=314 mg of KOH/g of polymer
$M_n$=1700 g/mol, $M_w$=3000 g/mol Calcium Carbonate Inhibition Test A solution of $NaHCO_3$, $Mg_2SO_4$, $CaCl_2$ and polymer is shaken in a waterbath for 2 h at 70° C. After filtering the still-warm solution through a 0.45 μm Milex filter, the Ca content of the filtrate is ascertained by complexometry or by means of a $Ca^{2+}$-selective electrode, and the $CaCO_3$ inhibition is ascertained in % by means of a before/after comparison (see formula I).

| | |
|---|---|
| $Ca^{2+}$ | 215 mg/L |
| $Mg^{2+}$ | 43 mg/L |
| $HCO_3^-$ | 1220 mg/L |
| $Na^+$ | 460 mg/L |
| $Cl^-$ | 380 mg/L |
| $SO_4^{2-}$ | 170 mg/L |
| Polymer | 5 mg/L |
| Temperature | 70° C. |
| Time | 2 hours |
| pH | 8.0-8.5 |

$$CaCO_3 \text{ inhibition} (\%) = \frac{\text{mg of }(Ca2+)\text{ after } 24\text{ h} - \text{mg of }(Ca2+)\text{ blank value after } 24\text{ h}}{\text{mg of }(Ca2+)\text{ zero value} - \text{mg of }(Ca2+)\text{ blank value after } 24\text{ h}} * 100$$

TABLE 1

| Example | Inhibition [%] |
|---|---|
| 1 | 40.9 |
| 2 | 48.5 |
| 3 | 55.4 |
| 4 | 32.1 |
| 5 | 36.7 |
| 6 | 28.2 |
| 7 | 34.1 |
| 8 | 44.1 |
| 9 | 30.5 |

The polymers were tested in the following phosphate-free formulations PF1 and PF2, and also in the phosphate-based formulation P1.

TABLE 2

| | PF 1 | PF 2 | P1 |
|---|---|---|---|
| Protease | 2.5 | 2.5 | 1 |
| Amylase | 1.0 | 1.0 | 0.2 |
| Nonionic surfactant | 5.0 | 5 | 3 |

TABLE 2-continued

|  | PF 1 | PF 2 | P1 |
|---|---|---|---|
| Polymer | 10 | 10 | 6.5 |
| Sodium percarbonate | 10.5 | 10.5 | 14 |
| Tetraacetylethylenediamine | 4 | 4 | 4 |
| Sodium disilicate | 2 | 2 | 2 |
| Sodium tripolyphosphate |  |  | 50 |
| Sodium carbonate | 19.5 | 19.5 | 18.8 |
| Sodium citrate dihydrate | 35 |  |  |
| Methylglycinediacetic acid | 10 | 45 |  |
| Hydroxyethane-(1,1-diphosphonic acid) | 0.5 | 0.5 | 0.5 |

Data in % by weight based on the total amount of all components

The following experimental conditions were observed:
Dishwasher: Miele G 1222 SCL
Program: 65° C. (with prewash)
Dishes: 3 knives (WMF Tafelmesser Berlin, monobloc)
  3 Amsterdam 0.2 L drinking glasses
  3 "OCEAN BLAU" breakfast plates (MELAMINE)
  3 porcelain plates: 19 cm plates with rims flat
Arrangement: Knives in the cutlery drawer, glasses in the upper baskets, plates in the lower basket
Dishwashing detergent: 18 g
Addition of soil: 50 g of ballast soil is added in thawed form with the formulation after the prewash; for composition see below
Rinse temperature: 65° C.
Water hardness: 21° German hardness (Ca/Mg):HCO3 (3:1):1.35
Wash cycles: 6; break in between for 1 h in each case (10 min with door open, 50 min with door closed)
Evaluation: Visually after 6 wash cycles The evaluation of the dishes was carried out after 6 cycles in a darkened chamber under light behind an aperture diaphragm using a grading scale from 10 (very good) to 1 (very poor). Grades from 1-10 for spotting (very many, intensive spots=1 ranging to no spots=10) and also for filming (1=very severe filming, 10=no filming) were awarded.

Composition of the Ballast Soil:
Starch: 0.5% potato starch, 2.5% gravy
Fat: 10.2% margarine
Protein: 5.1% egg yolk, 5.1% milk
Others: 2.5% tomato ketchup, 2.5% mustard, 0.1% benzoic acid, 71.4% water Result:
The formulation containing polymer are characterized in particular by their very high film-inhibiting effect towards inorganic and organic deposits on glass, knives, porcelain and plastic components. Furthermore, they increase the cleaning power of the dishwashing detergent and encourage the water to run off from the dishes.

The tables below list the summed grades for film formation and spotting on knives and drinking glasses.

Phosphate-free formulation PF 1

| Polymer | Knives (F + S) | Glasses (F + S) |
|---|---|---|
| 2 | 17 | 13 |
| 3 | 18 | 11 |
| 5 | 18 | 11 |
| 8 | 16 | 12 |
| without | 8 | 7 |

Phosphate-free formulation PF 2

| Polymer | Knives (F + S) | Glasses (F + S) |
|---|---|---|
| 2 | 14 | 12 |
| 3 | 11 | 10 |
| 5 | 14 | 11 |
| 8 | 13 | 13 |
| without | 7 | 8 |

The invention claimed is:

1. An additive comprising a branched polyester obtained by polycondensation monomers consisting of
   a. citric acid as component A with
   b. at least one polyalcohol as component B and
   c. optionally an aliphatic dicarboxylic acid component as component C and reaction with
   d. at least one component D selected from the group consisting of C6-C30 alkyl- or alkenylcarboxylic acids, C6-C30 alkyl or alkenyl alcohols, C6-C30 alkyl- or alkenylamines, and C6-C30 aliphatic isocyanates, during the polycondensation or subsequently,
   wherein the additive is used in a washing composition, a cleaner, a detergent or a formulation for water treatment, wherein the branched polyester has a molecular weight $M_n$ of from 400 to 5,000 g/mol; and
   wherein the polycondensation does not utilize an enzyme; wherein the molar ratio of (component A+component B) to component D is 10:0.1 to 0.5:0.1.

2. The additive according to claim 1, wherein the additive is a scale inhibitor in a water-conveying system.

3. The additive according to claim 1, wherein the molar ratio of citric acid to polyalcohol is 5.0:1.0 to 1.0:1.5.

4. The additive according to claim 1, wherein component B is ethylene glycol, 1,2-propanediol, 1,3-propanediol, 1,4-butanediol, 1,5-pentanediol, 1,6-hexanediol, diethylene glycol, triethylene glycol, dipropylene glycol, tripropylene glycol, polyethylene glycol with an average molecular weight between 200 and 1000 g/mol, glycerol, diglycerol, triglycerol, trimethylolpropane, trimethylolethane, di(trimethylolpropane), 1,2,4-butanetriol, 1,2,6-hexanetriol, pentaerythritol, sucrose, sorbitol, glucaric acid, or polyetherols thereof based on ethylene oxide and/or propylene oxide, or a mixture thereof.

5. The additive according to claim 1, wherein component B is diethylene glycol with an average molecular weight between 200 and 1000 g/mol, polyethylene glycol with an average molecular weight between 200 and 1000 g/mol, trimethylolpropane, glycerol, diglycerol, triglycerol, or polyetherols thereof based on ethylene oxide or propylene oxide, or a mixture thereof.

6. The additive according to claim 1, wherein component C is malonic acid, succinic acid, glutaric acid, adipic acid, sebacic acid, octadecenylsuccinic anhydride, a 1,2-cyclohexanedicarboxylic acid, a 1,3-cyclohexanedicarboxylic acid, a 1,4-cyclohexanedicarboxylic acid, cis-hexahydrophthalic acid, trans-hexahydrophthalic acid, a mixture of cis-hexahydrophthalic acid and trans-hexahydrophthalic acid, phthalic acid, isophthalic acid, terephthalic acid, anhydrides, monoalkyl esters or dialkyl esters.

7. The additive according to claim 1, wherein component D is oleic acid, palmitic acid, linoleic acid, stearic acid, lauric acid or ricinoleic acid.

8. The additive according to claim 1, wherein the washing composition is a dishwashing composition.

9. A process for preparing the hydrophobically modified branched polyesters of the additive according to claim 1, comprising polycondensing monomers consisting of
  a) citric acid as component A,
  b) at least one polyalcohol as component B, and
  c) optionally an aliphatic dicarboxylic acid component as component C to give branched polyesters, and
  reacting a component D during or subsequent to the polycondensation, wherein component D is selected from the group consisting of C6-C30 alkyl- or alkenylcarboxylic acids, C6-C30 alkyl or alkenyl alcohols, C6-C30 alkyl- or alkenylamines, and C6-C30 aliphatic isocyanates; and wherein the polycondensation does not utilize an enzyme;
  wherein the molar ratio of (component A+component B) to component D is 10:0.1 to 0.5:0.1.

10. A hydrophobically modified branched polyester prepared according to the process according to claim 9.

11. The additive according to claim 1, wherein component C is selected from the group consisting of oxalic acid, malonic acid, succinic acid, glutaric acid, adipic acid, pimelic acid, suberic acid, azaleic acid, sebacic acid, undecane-$\alpha,\omega$-dicarboxylic acid, dodecane-$\alpha,\omega$-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and combinations thereof, optionally substituted by one or more radicals selected from the group consisting of $C_1$-$C_{20}$-alkyl groups, $C_2$-$C_{20}$-alkenyl groups, $C_3$-$C_{12}$-cycloalkyl groups, alkylene groups, or $C_6$-$C_{14}$-aryl groups.

* * * * *